US006408541B1

(12) United States Patent
Moretti

(10) Patent No.: US 6,408,541 B1
(45) Date of Patent: Jun. 25, 2002

(54) WATERPROOF AND MOISTURE-PERMEABLE SHOE AND METHOD FOR MANUFACTURE THEREOF

(75) Inventor: Mario Polegato Moretti, Crocetta del Montello (IT)

(73) Assignee: Nottington Holding B.V., Amsterdam (NL)

( * ) Notice: Subject to any disclaimer, the term of this patent is extended or adjusted under 35 U.S.C. 154(b) by 0 days.

(21) Appl. No.: 09/666,475

(22) Filed: Sep. 20, 2000

(30) Foreign Application Priority Data

Sep. 21, 1999 (IT) .......................... PD99A0207
Nov. 25, 1999 (IT) .......................... PD99A0263

(51) Int. Cl.[7] .......................... A43B 13/28; A43B 9/10
(52) U.S. Cl. .............................. 36/12; 36/16; 36/30 R; 36/19 R
(58) Field of Search .............................. 36/14, 12, 16, 36/19.3, 3 R, 3 B, 30 R, 30 A, 75 R, 43, 44, 19 R

(56) References Cited

U.S. PATENT DOCUMENTS

| | | | | |
|---|---|---|---|---|
| 967,572 A | * | 8/1910 | Schwamder | 36/16 |
| RE21,656 E | * | 12/1940 | Lumbard | 36/16 |
| 2,669,953 A | * | 2/1954 | Slinkard | 36/16 |
| 2,715,285 A | * | 8/1955 | Del Vecchio | 36/16 |
| 2,776,501 A | * | 1/1957 | Curtin | 36/16 |
| 3,583,080 A | * | 6/1971 | Wagner | 36/16 |
| 4,001,954 A | * | 1/1977 | Taylor, Jr. | 36/16 |
| 4,899,465 A | * | 2/1990 | Bleimhofer et al. | 36/14 |
| 5,644,856 A | * | 7/1997 | Bray, Jr. | 36/16 |
| 5,746,012 A | * | 5/1998 | Caletti et al. | 36/3 B |
| 5,943,791 A | * | 8/1999 | Pavelescu et al. | 36/14 |
| 5,983,524 A | | 11/1999 | Polegato | |
| 5,992,054 A | * | 11/1999 | Rauch | 36/30 R |
| 6,192,605 B1 | * | 2/2001 | Challant | 36/12 |

OTHER PUBLICATIONS

U.S. application No. 09/423,299, filed Nov. 9, 1999, pending.
U.S. application No. 09/666,475, filed Sep. 20, 2000, pending.

* cited by examiner

Primary Examiner—Anthony Stashick
(74) Attorney, Agent, or Firm—Oblon, Spivak, McClelland, Maier & Neustadt, P.C.

(57) ABSTRACT

A waterproof and moisture-permeable shoe which includes: a moisture-permeable and waterproof upper assembly having a lower outwardly-folded edge; an insole having an outer peripheral component to which the lower outwardly-folded edge of the upper assembly is perimetrically connected; a plurality of stitches which connect the lower outwardly-folded edge of the upper assembly perimetrically to the outer peripheral component of the insole; a waterproof outsole connected below the insole; and a waterproof sealing connecting element which is made of moisture-impermeable sealing material and which connects the lower outwardly-folded edge of the upper assembly to the outer peripheral component of the insole in at least one sealed region such as to provide a waterproof seal in the at least one sealed region. The moisture-impermeable sealing material of the waterproof sealing connecting element is a hardened material which has been injected in a fluid state, preferably as a portion of the outsole.

26 Claims, 9 Drawing Sheets

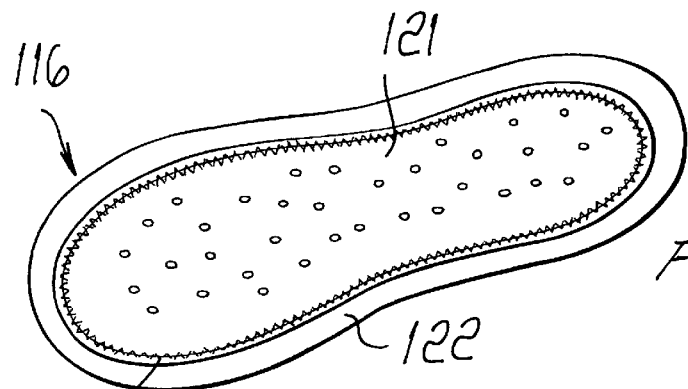
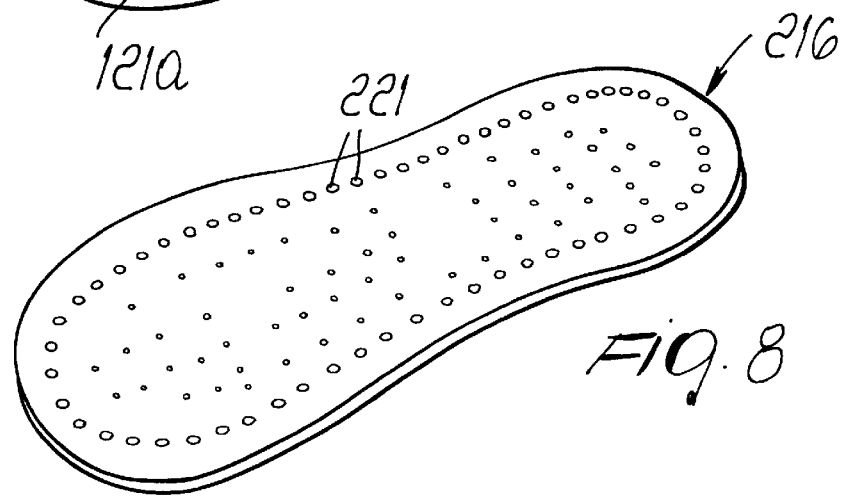
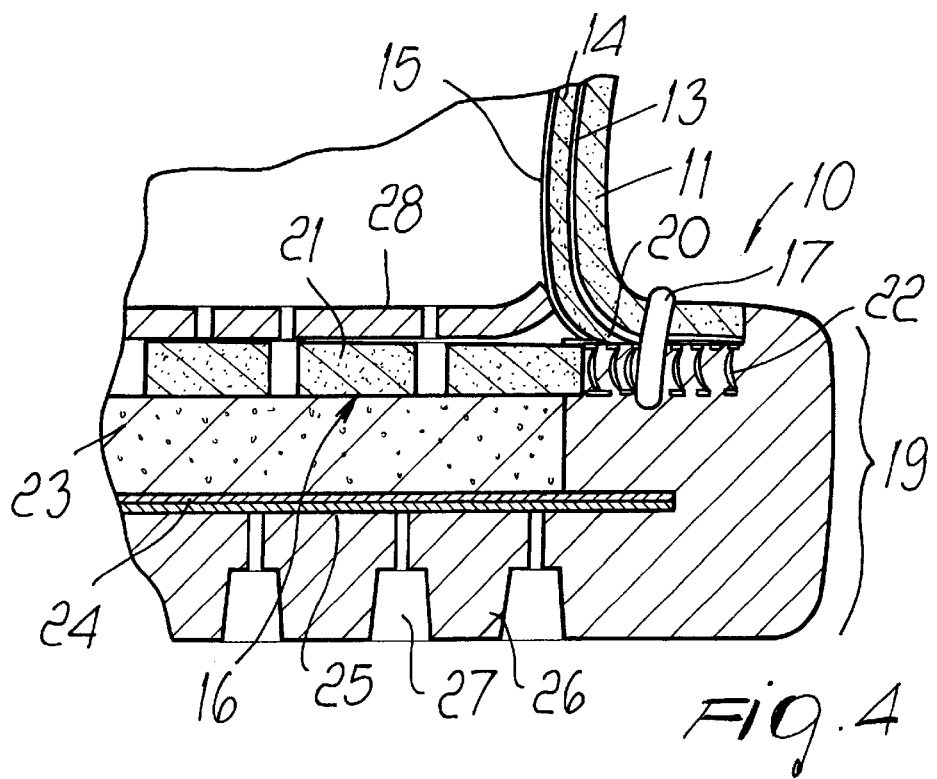

WATERPROOF AND MOISTURE-PERMEABLE SHOE AND METHOD FOR MANUFACTURE THEREOF

BACKGROUND OF THE INVENTION

The present invention relates to a waterproof and moisture-permeable shoe, and to a method for manufacturing a waterproof and moisture-permeable shoe. As used herein, the term "waterproof" (or "impermeable") means, especially with reference to a structural element of the shoe, the characteristic of blocking the passage of water through such structural element and in particular of blocking the entry of water from outside the shoe into the inside of the shoe, and the term "moisture-permeable" means, especially with reference to a structural element of the shoe, the characteristic of allowing moisture to pass through such structural element and in particular of permitting moisture to pass from the inside of the shoe to the outside of the shoe.

A manufacturing method commonly termed "IDEAL" is already known in the shoe-making field and entails outwardly folding the lower perimetric edge of the upper with the corresponding lining and stitching such edge on an assembly insole which is conveniently leveled perimetrically on such folded edge.

The sole is then joined by gluing or direct injection in a mold.

This type of manufacturing gives the shoe excellent flexibility and higher quality characteristics due to the presence of the visible stitched seams on the outer edge.

On the other hand, if the internal lining of the upper has a moisture-permeable waterproof membrane, waterproofing is almost completely absent, due to the possible penetration of water toward the inside through the stitched seam and its subsequent migration through the insole as well as through the open cut of the upper.

Currently, in order to solve this drawback and make shoes produced with the IDEAL process impermeable, the lining provided with moisture-permeable and waterproof membrane is folded toward the inside of a waterproof insole instead of outwardly.

The upper on its own is normally stitched to the sole or to a mid-sole of waterproof material which also acts as a sealant for the lining.

This production process, however, is very complicated and therefore expensive.

One alternative is to use a bag-like lining and to apply to the bottom of the bag an insole on which the upper is folded outwardly and stitched perimetrically.

This production process is also very complicated and delicate.

SUMMARY OF THE INVENTION

One aim of the present invention is to provide a shoe in which at least the upper is impermeable and moisture-permeable and is produced with the IDEAL method in a manner which is productively simple and inexpensive, at the same time solving the problem of sealing the stitched edge region.

Another object of the present invention is to provide a shoe which can be conveniently produced equally with a simply waterproof sole or with a waterproof and moisture-permeable sole.

Another object of the present invention is to provide a shoe whose cost is competitive with respect to the costs of conventional IDEAL-type shoes.

In accordance with one preferred aspect of the invention, there is provided a waterproof and moisture-permeable shoe which includes: a moisture-permeable and waterproof upper assembly having a lower outwardly-folded edge; an insole having an outer peripheral component to which the lower outwardly-folded edge of the upper assembly is perimetrically connected; a plurality of stitches which connect the lower outwardly-folded edge of the upper assembly perimetrically to the outer peripheral component of the insole; a waterproof outsole connected below the insole; and a waterproof sealing connecting element which is made of moisture-impermeable sealing material and which connects the lower outwardly-folded edge of the upper assembly to the outer peripheral component of the insole in at least one sealed region such as to provide a waterproof seal in the at least one sealed region. In a preferred embodiment, the moisture-impermeable sealing material of the waterproof sealing connecting element is a hardened material which has been injected in a fluid state, preferably as a portion of the outsole.

In accordance with another aspect of the invention, there is provided an upper/insole assembly for use in a waterproof and moisture-permeable shoe, the upper/insole assembly including: a moisture-permeable and waterproof upper assembly having a lower outwardly-folded edge; an insole having an outer peripheral component to which the lower outwardly-folded edge of the upper assembly is perimetrically connected; a plurality of stitches which connect the lower outwardly-folded edge of the upper assembly perimetrically to the outer peripheral component of the insole; and a waterproof sealing connecting element which is made of moisture-impermeable sealing material and which connects the lower outwardly-folded edge of the upper assembly to the outer peripheral component of the insole in at least one sealed region such as to provide a waterproof seal in the at least one sealed region. In a preferred embodiment, the moisture-impermeable sealing material of the waterproof sealing connecting element is a hardened material which has been injected in a fluid state.

Still according to a further aspect of the invention, there is provided a method for manufacturing a waterproof and moisture-permeable shoe, which includes the steps of: providing a moisture-permeable and waterproof upper assembly having a lower outwardly-folded edge which extends outwardly away from the inside of the shoe; providing an insole having an outer peripheral component; connecting the lower outwardly-folded edge of the upper assembly perimetrically to the outer peripheral component of the insole by stitching with a plurality of stitches; providing a waterproof outsole and connecting the waterproof outsole below the insole; and connecting the lower outwardly-folded edge of the upper assembly to the outer peripheral component of the insole in at least one sealed region such as to provide a waterproof seal in the at least one sealed region by means of a waterproof sealing connecting element which is made of moisture-impermeable sealing material. In a preferred embodiment, the method includes injecting the moisture-impermeable sealing material of the waterproof sealing connecting element in a fluid state, and consequently allowing the moisture-impermeable sealing material to harden. In a further preferred aspect of method according to the invention, the outsole is injection molded and the waterproof sealing connecting element is formed from a portion of the outsole.

BRIEF DESCRIPTION OF THE DRAWINGS

The particular technical characteristics and advantages of the present invention will become better apparent from the following detailed description of some referred embodiments thereof, illustrated only by way of non-limitative example in the accompanying drawings, wherein:

FIG. 4 is an enlarged-scale view of a detail of the cross-section of FIG. 2;

FIG. 6 is a view of an assembly insole used among the components of the shoe of FIG. 5;

FIG. 8 is a view of an assembly insole used among the components of the shoe of FIG. 7;

DESCRIPTION OF THE PREFERRED EMBODIMENTS

Figure 1:
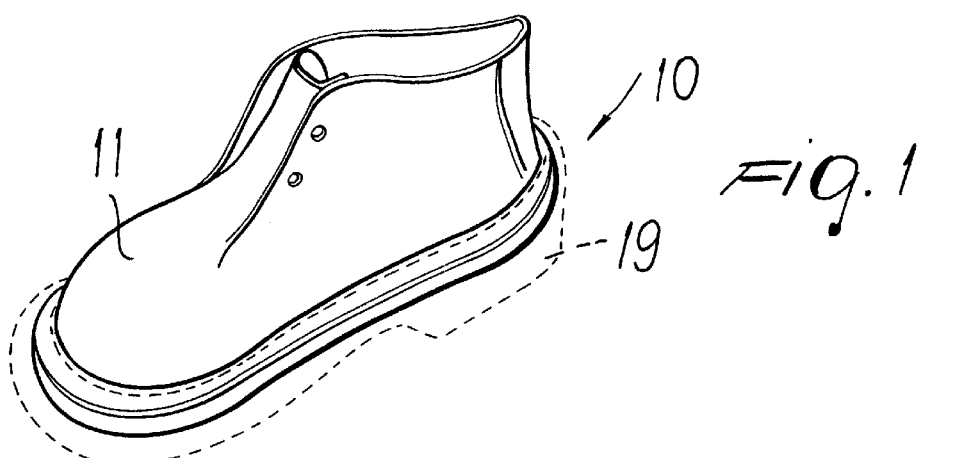
FIG. 1 is a perspective view of the shoe in a first embodiment thereof, with the sole shown in dashed lines.

With reference to FIGS. 1 to 4, a waterproof and moisture-permeable shoe according to the invention is designated by the reference numeral 10 in a first embodiment.

The shoe 10 comprises a composite moisture permeable and waterproof upper structure formed of a moisture-permeable upper 11, made for example of natural leather without hiding pigments, which is associated with a lining 12 which is constituted in succession by a moisture-permeable and waterproof membrane 13 arranged adjacent to the upper 11, by a layer 14 made of moisture-permeable open-cell foamed polymer or other suitable materials (felts, et cetera), and by an internal moisture-permeable fabric 15.

In other cases, the lining can of course be provided without at least one of the layers 14 and 15 and/or can have layers of different materials, which in any case is such as to allow to provide an overall moisture-permeable and waterproof internal lining.

The various parts of the lining 12 may be mutually joined by stitching at selected stitched regions which are conveniently sealed for example by means of adhesives and/or sealants or by means of appropriate thermal bonding processes, so as to avoid compromising the waterproofness and moisture-permeability of the lining 12.

The lining 12 is associated with the upper 11 by spot gluing, i.e. only at selected regions, so as to avoid compromising moisture permeation through the membrane 13, and thereby to produce an upper assembly which is formed by the mutually joined upper 11 and lining 12, and which is also itself moisture-permeable and waterproof.

The shoe 10 further comprises an insole 16 to which a lower edge 18 of the upper 11, which is folded outwardly with respect to the inside of the shoe, is joined perimetrically by means of stitched seams 17.

The shoe 10 further comprises a sole or composite outsole structure, generally designated by the reference numeral 19, which is waterproof and moisture-permeable, and is joined in a downward region to the insole 16.

Figure 2:
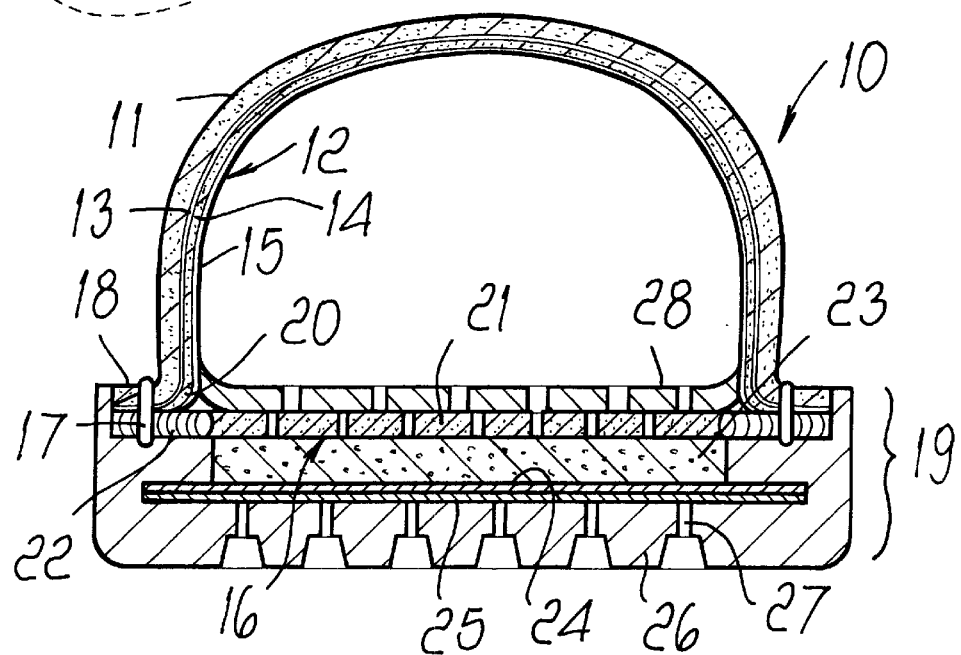
FIG. 2 is an enlarged-scale transverse sectional view of the shoe of FIG. 1.
Figure 3:
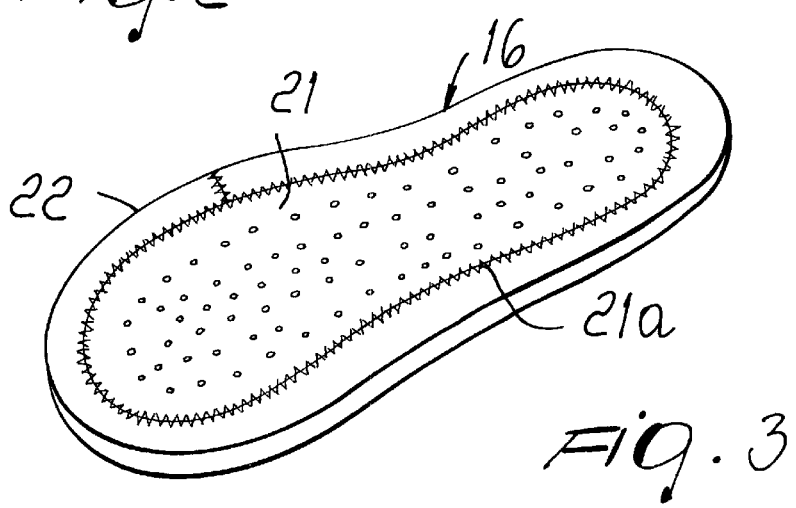
FIG. 3 is a perspective view of an assembly insole which is comprised within the components of the shoe of FIGS. 1 and 2.

According to one preferred aspect of the invention, the lower edge 20 of the lining 12, with the membrane 13 exposed due to paring with removal of the fabric 15 (as seen in FIGS. 2 and 4) after the composite upper structure is formed, is folded outwardly together with the edge 18 of the upper 11.

Alternatively, the membrane 13 can be exposed due to the fact that the fabric 15 has smaller dimensions than the membrane 13 prior to (and after) assembly of the composite upper structure.

Moreover, the insole 16 is made of two components (FIG. 3): an inner one 21, which constitutes a structural support and can be made of moisture-permeable materials such as fabric, leather, felt, cellulose material, et cetera, or perforated materials sufficient to allow moisture to pass therethrough; and an outer peripheral component 22, which is constituted by a perimetric ring surrounding the inner component 21, and which outer component 22 is made of a fabric which is permeable to plastic materials, particularly polyurethane, in the fluid state, acting as sealants as will become apparent hereinbelow.

The components 21 and 22 of the insole are joined to each other by stitched seams 21a.

Also according to the invention, the sole 19 is at least partially made of injection-molded plastic materials, particularly polyurethane, at least at the regions of the stitched seam 17 and of the edge of the lining 12 with the membrane 13, so as to form a seal by penetration of the fluid plastic materials, or polyurethane, during the injection-molding operation into the seam 17 and lining 12, fully separating and waterproofing the inside of the shoe from the outside in these critical regions.

In particular, the fluid materials may penetrate through the outer component 22 about the stitched seams 17 and bond with the outwardly-folded edge 20 of the lining 12, and/or with the outwardly folded edge 18 of the upper 11. For this purpose therefore, at least one or more of the components 13, 14, and 15 of the lining 12 (including in particular the membrane 13), and/or the outwardly folded edge 18 of the upper 11, and/or the stitched seams 17 themselves, may be made of materials which are permeable to plastics materials, in particular polyurethane, in their fluid state.

The sole 19 is composite and has in succession, below the insole 16, a filling layer 23 made of moisture-permeable material, such as felt or perforated material, a membrane 24 which is waterproof and moisture-permeable, a protective layer 25 which is coupled to the membrane 24 and is made of hydrolysis-resistant, water-repellent, moisture-permeable or perforated material, and a tread 26 with through holes 27 between the protective layer 25 and the region for contact with the ground. The composite sole 19 is thereby waterproof and moisture-permeable.

The perimetric edges of the membrane 24 and of the protective layer 25 are conveniently sealed by the polyurethane mass that connects the tread 26 to the upper 11, which also provides the above-mentioned seal at the stitched seams 17.

The shoe is completed by a perforated and/or moisture-permeable inner sole or insert 28 made for example of leather.

Figure 5:
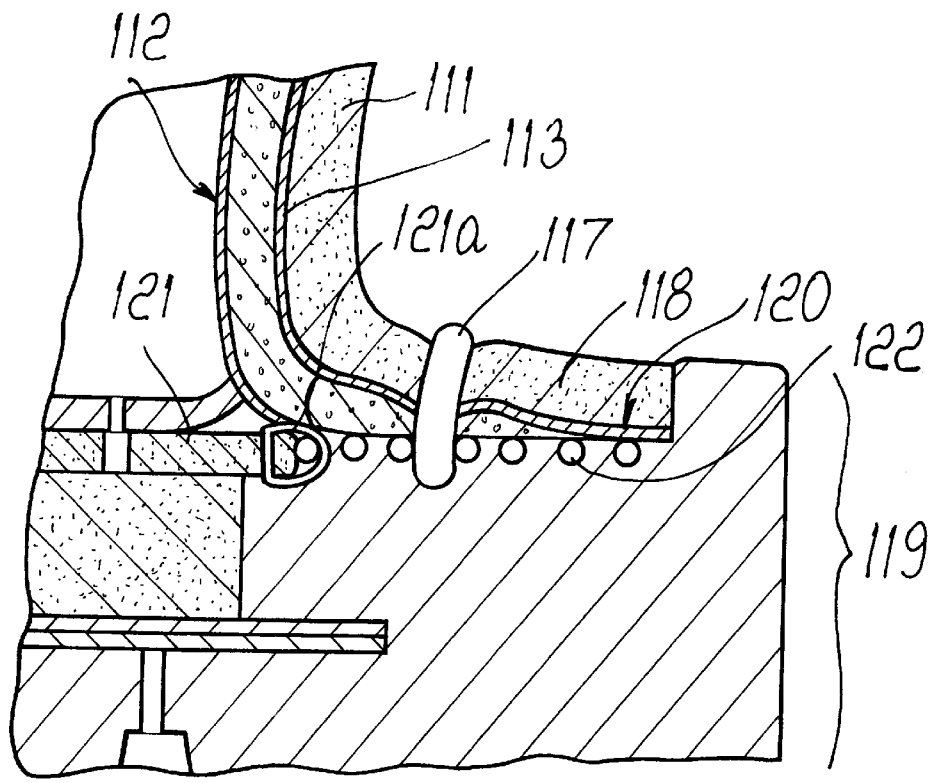
FIG. 5 is an enlarged-scale sectional view of a detail of a second embodiment of the shoe.

With reference now to FIGS. 5 and 6, a second embodiment uses, again with the same manufacturing technology as in the first embodiment of FIGS. 1–4, however with a different insole, now designated by the reference numeral 116, which is constituted by an inner moisture-permeable component 121 made of fabric, leather, felt, cellulose material et cetera and/or perforated material, as in the preceding case thereby to allow moisture to pass through the inner component 121, and by an outer ring 122 made of a thin mesh which is perimetrically joined by means of stitched seams 121a to the component 121. The outer ring 122 is thus permeable to plastic materials, particularly polyurethane, in the fluid state.

The manufacturing process provided is the same as in the preceding case: the edge of the upper 111 that is joined to the lining 112 is folded outwardly and joined by means of stitched seams 117 to the ring 122 of the insole 116; and the sole 119 is then injection-molded, sealing the regions below the edge 118 of the upper 111 to the edge 120 of the lining 112 with the membrane 113. In particular, the fluid materials may penetrate through the outer ring 122 about the stitched seams 117 and bond with the outwardly-folded edge 120 of the lining 112, and/or with the outwardly folded edge 118 of the upper 111. For this purpose therefore, at least one or more of the components of the composite lining 112 (including in particular the membrane 113), and/or the outwardly folded edge 118 of the upper 111, and/or the stitched seams 117 themselves, may be made of materials which are permeable to plastics materials, in particular polyurethane, in their fluid state.

Figure 7:
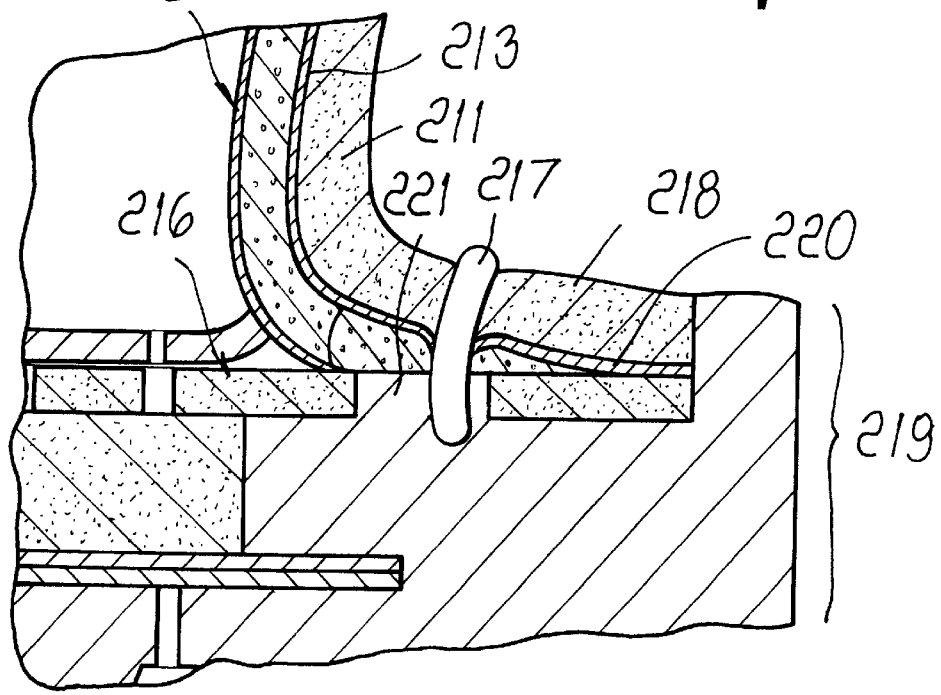
FIG. 7 is a enlarged-scale sectional view of a detail of a third embodiment of the shoe.
Figure 9:
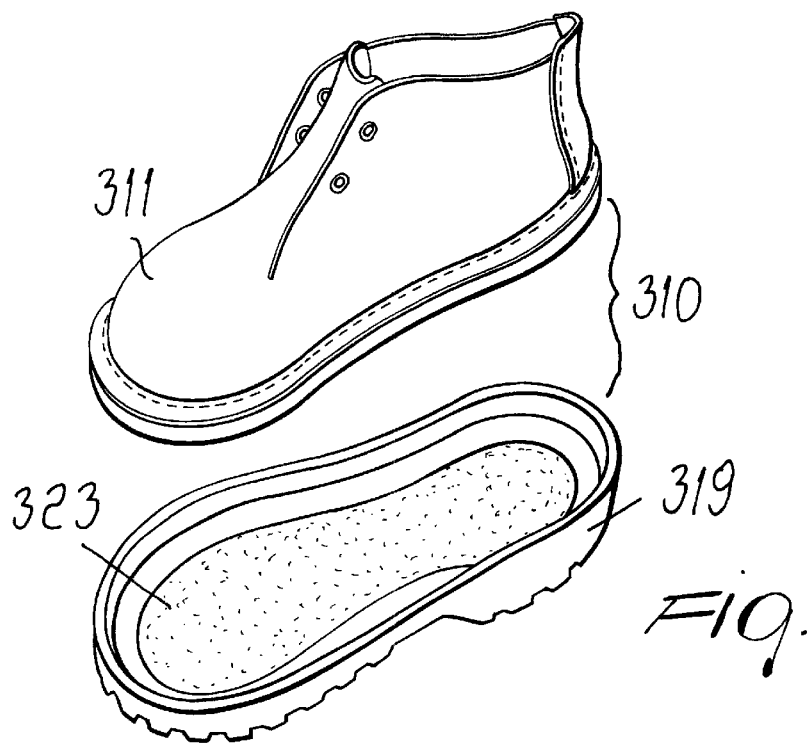
FIG. 9 is an exploded perspective view of the shoe in a fourth embodiment thereof.
Figure 10:
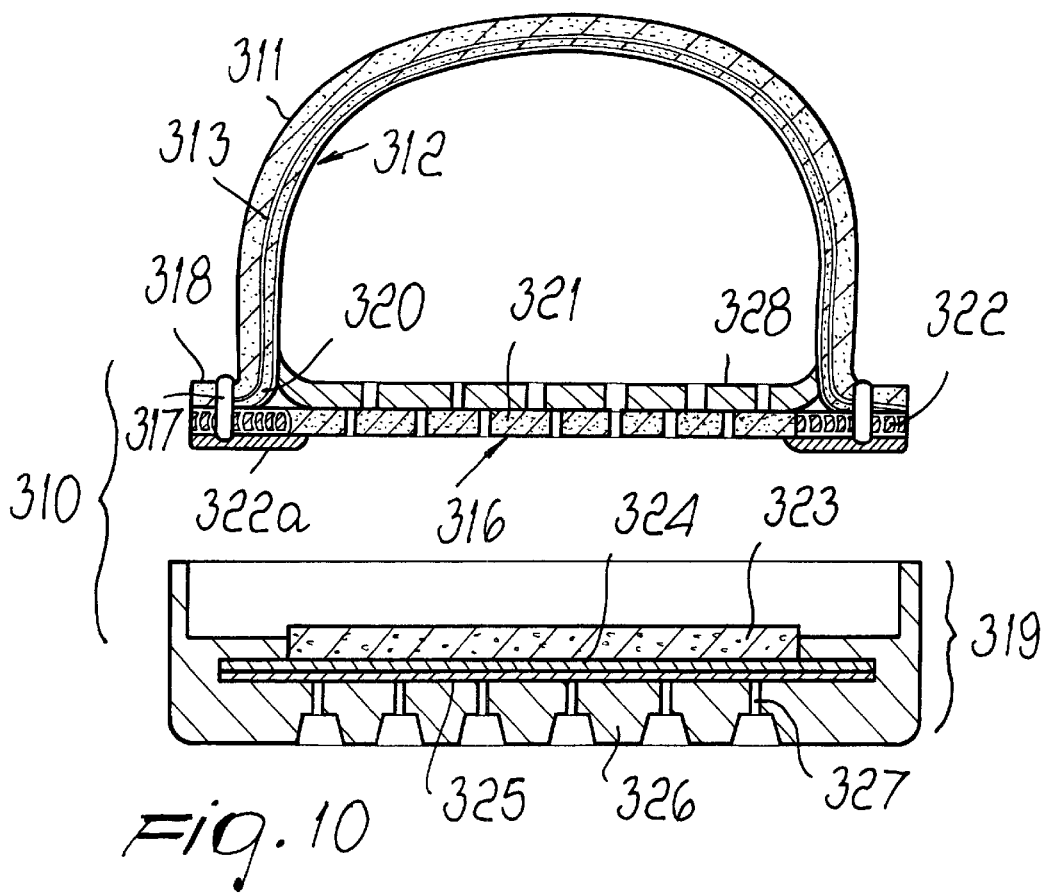
FIG. 10 is an enlarged-scale exploded transverse sectional view of the shoe of FIG. 9.
Figure 11:
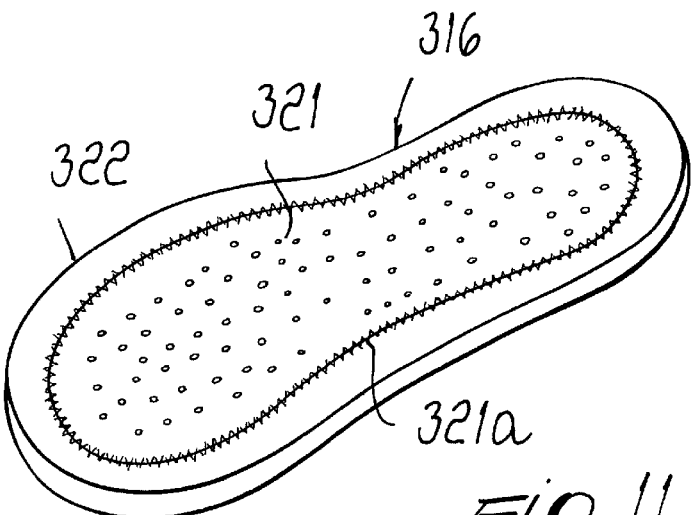
FIG. 11 is a perspective view of an assembly insole comprised within the components of the shoe of FIGS. 9 and 10.

With reference now to FIGS. 7 and 8, in a third possible embodiment the insole, now designated by the reference numeral 216, is made of a single piece of moisture-permeable material, such as leather, felt, cellulose material et cetera and/or perforated material so as to allow moisture to pass through the single piece insole, which further has at least one row of holes 221 along its entire perimeter at a preset distance from the outside edge, so that the insole 216 is, through the holes 221, joined by means of stitched seams 217 to the folded edge 218 of the upper 211 which is coupled to the edge 220 to lining 212 with the membrane 213.

As regards the rest, the manufacturing process is the same as in the preceding embodiments, with injection-molding of the polyurethane sole 219 to seal the stitched seams 217 and the adjacent regions. In particular, the fluid materials may penetrate through the holes 221 about the stitched seams 217 and bond with the outwardly-folded edge 220 of the lining 212, and/or with the outwardly folded edge 218 of the upper 211. For this purpose, therefore, at least one or more of the components of the composite lining 212 (including in particular the membrane 213), and/or the outwardly folded edge 218 of the upper 211, and/or the stitched seams 217 themselves, and/or the insole 216 itself may be made of materials which are permeable to plastics materials, in particular polyurethane, in their fluid state.

With reference to FIGS. 9 to 12, a waterproof and moisture-permeable shoe according to the invention is designated by the reference numeral 310 in a fourth embodiment.

The shoe 310 comprises a composite moisture permeable and waterproof upper structure formed of a moisture-permeable upper 311, made for example of natural leather without hiding pigments, which is associated with a lining 312 which is constituted in succession by a waterproof and moisture-permeable membrane 313 arranged adjacent to the upper 311, by a layer 314 made of moisture-permeable open-cell foamed polymer, and by an internal moisture-permeable fabric 315.

In other cases, the lining can of course be provided without at least one of the layers 314 and 315 and/or can have layers of different materials, which in any case is such as to allow to provide an overall moisture-permeable and waterproof lining.

The various parts of the lining 312 may be mutually joined by stitching at selected stitched regions which are conveniently sealed for example by means of adhesives and/or sealants or by means of appropriate thermal bonding processes, so as to avoid compromising the waterproofness and moisture-permeability of the lining 12.

The lining 312 is associated with the upper 311 by spot gluing, i.e. only at selected regions, so as to avoid compromising moisture permeation through the membrane 313, and thereby to produce an upper assembly which is formed by the mutually joined upper 311 and lining 312, and which is also itself moisture-permeable and waterproof.

The shoe 310 also comprises an insole 316 to which a lower edge 318 of the upper 311, which is folded outwardly with respect to the inside of the shoe, is joined perimetrically by means of stitched seams 317.

The shoe 310 further comprises a sole or composite outsole structure, generally designated by the reference numeral 319, which is waterproof and moisture-permeable, and is joined below the insole 316.

According to one preferred aspect of the invention, the lower edge 320 of the lining 312, with the membrane 313 exposed due to paring with removal of the fabric 315 (as seen in particular in FIGS. 10 and 12) after the composite upper structure is formed, is folded outwardly together with the edge 318 of the upper 311. Alternatively, the membrane 313 can be exposed due to the fact that the fabric 315 has smaller dimensions than such membrane 313 prior to (and after) assembly of the composite upper structure.

The insole 316 is formed by two components (FIG. 11): an inner one 321, which constitutes a structural support and can be made of moisture-permeable materials such as fabric, leather, felt, cellulose material, et cetera, or perforated materials sufficient to allow moisture to pass therethrough; and an outer component 322, which is constituted by a perimetric ring surrounding the inner component 321, and which outer component 322 is made of a fabric which is permeable to sealants such as silicones, polymers in an aqueous disperse system, polymers in a solvent solution, thermoplastic products, or equivalent products.

The components 321 and 322 of the insole are mutually joined by means of stitched seams 321a; the component 322, after stitching to the upper 311, is impregnated with such sealants (silicones, polymers in an aqueous disperse system, polymers in a solvent solution, thermoplastic products, or equivalent products: see the reference numeral 322a of the figures).

In particular, the sealants 322a may penetrate through the outer component 322 about the stitched seams 317 and bond with the outwardly folded edge 320 of the lining 312, and/or with the outwardly folded edge 318 of the upper 311. For this purpose therefore, at least one or more of the components 313, 314, 315 of lining 312 (including in particular the membrane 313), and/or the outwardly folded edge 318 of the upper 311, and/or the stitched seams 317 themselves, may be made of materials which are permeable to such sealants so as to provide an overall sealed configuration which prevents passage of moisture through the thus sealed regions.

According to this particular embodiment of the invention, the sole 319 is in this case produced initially separately from the composite upper/insole assembly, for example using polyurethane, and is then joined to the rest of the shoe by means of adhesive 319a at least at the regions of the stitched seam 317 and at the edge of the lining 312 with the membrane 313 so as to form a seal, completely separating and waterproofing the inside of the shoe from the outside in these critical regions. The adhesive 319a may be chosen such that a moisture-proof seal is provided at its surfaces in contact with both the sealants 322a and the relevant portions of the upper assembly, and the corresponding portion of the sole 319.

Gluing can be performed with the same materials used for sealing, also in a step in which the sealants 322a are still active after impregnation of the component 322.

The sole 319 is composite and has in succession, below the insole 316, a filler layer 323 of moisture-permeable material, such as felt or perforated material, a moisture-permeable and waterproof membrane 324, a protective layer 325 which is coupled to the membrane 324 and is made of a material which is hydrolysis-resistant, water-repellent, moisture-permeable or perforated, and a tread 326 with through holes 327 between the protective layer 325 and the region for contact with the ground. The composite sole 319 is thereby waterproof and moisture-permeable.

The perimetric edges of the membrane 324 and of the protective layer 325 are conveniently sealed, for example by the polyurethane mass of the sole 319 about the membrane 324 and protective layer 325.

The shoe is completed by an inner sole or insert 328 which is perforated and/or moisture-permeable and is made for example of leather.

Figure 14:
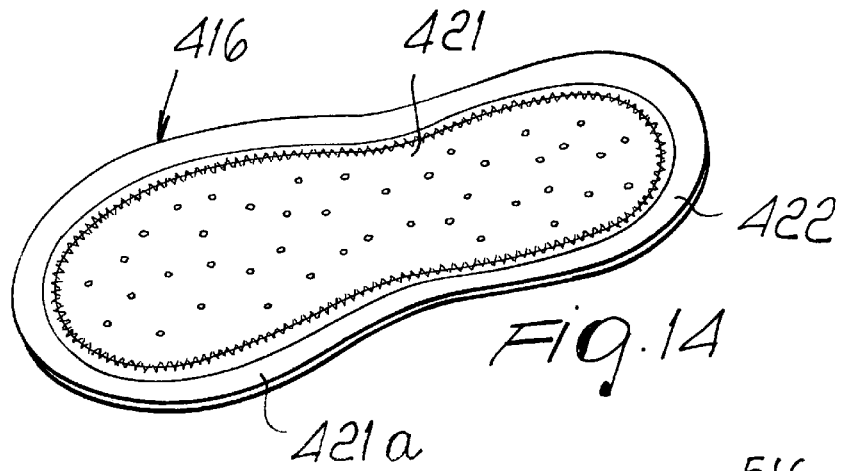
FIG. 14 is a view of an assembly insole used among the components of the shoe of FIG. 13.
Figure 13:
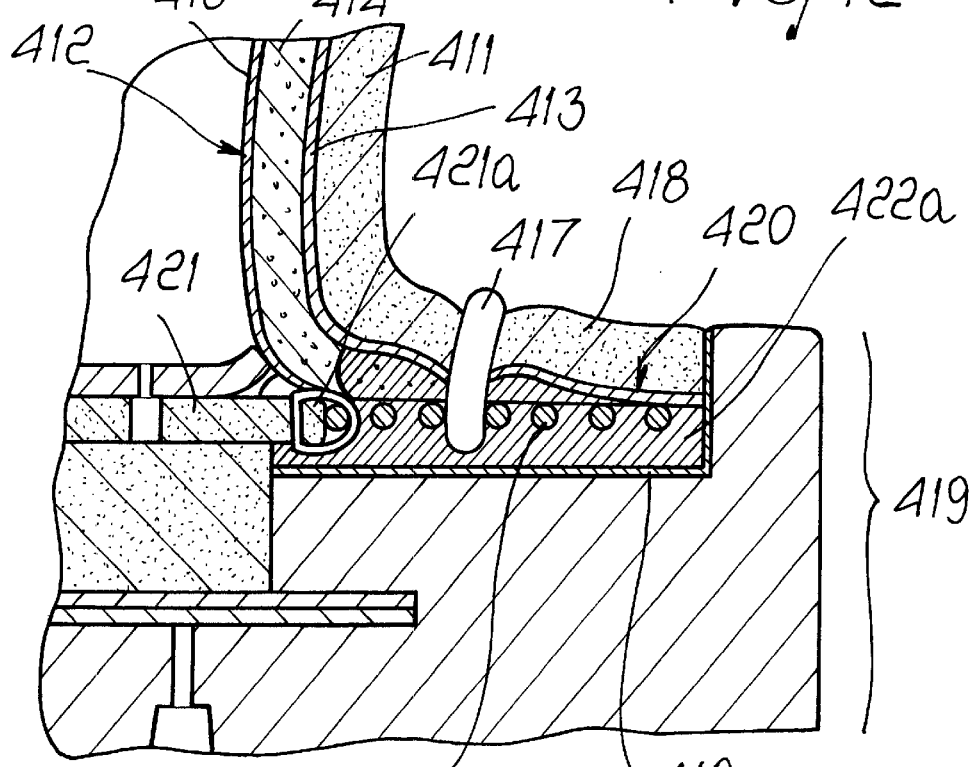
FIG. 13 is an enlarged-scale sectional view of a detail of a fifth embodiment of the shoe.

With reference now to FIGS. 13 and 14, a fifth embodiment uses, again with the same manufacturing technology as described above for the previous embodiment of FIGS. 9–12, however with a different insole, now designated by the reference numeral 416, which is constituted by an inner moisture-permeable component 421 made of fabric, leather, felt, cellulose material, et cetera and/or perforated material, as in the preceding case thereby to allow moisture to pass through the inner component 121, and by an outer ring 422 made of a thin mesh which is perimetrically joined by means of stitched seams 421a to the component 421. The outer ring 122 is thus permeable to the above described sealants (silicones, polymers in an aqueous disperse system, polymers in a solvent solution, thermoplastic products, or equivalent products).

The manufacturing process provided is the same as in the preceding case of FIGS. 9–12: the edge of the upper 411, joined to the lining 412, is folded outward and is joined by means of stitched seams 417 to the ring 422 of the insole 416; then impregnation with sealants 422a is performed, and glue 419a is used to join the sole 419, sealing the regions below the edge 418 of the upper 411 to the edge 420 of the lining 412 with the membrane 413.

In particular, the sealants 422a may penetrate through the outer component 422 about the stitched seams 417 and bond with the outwardly folded edge 420 of the lining 412, and/or with the outwardly folded edge 418 of the upper 411. For this purpose therefore, at least one or more of the components 413, 414, 415 of lining 412 (including in particular the membrane 413, and middle filler layer 414 as seen in FIG. 13), and/or the outwardly folded edge 418 of the upper 411, and/or the stitched seams 417 themselves, may be made of materials which are permeable to such sealants so as to provide an overall sealed configuration which prevents passage of moisture through the thus sealed regions. The composite upper/insole assembly may be initially formed separately from the composite outsole assembly, and then these two separate composite assemblies may be mutually joined to form the shoe, for example by means of the adhesives 419a. The adhesive 419a may be chosen such that a moisture-proof seal is provided at its surfaces in contact with both the sealants 422a and the relevant portions of the upper assembly, and the corresponding portion of the sole 419.

Figure 16:
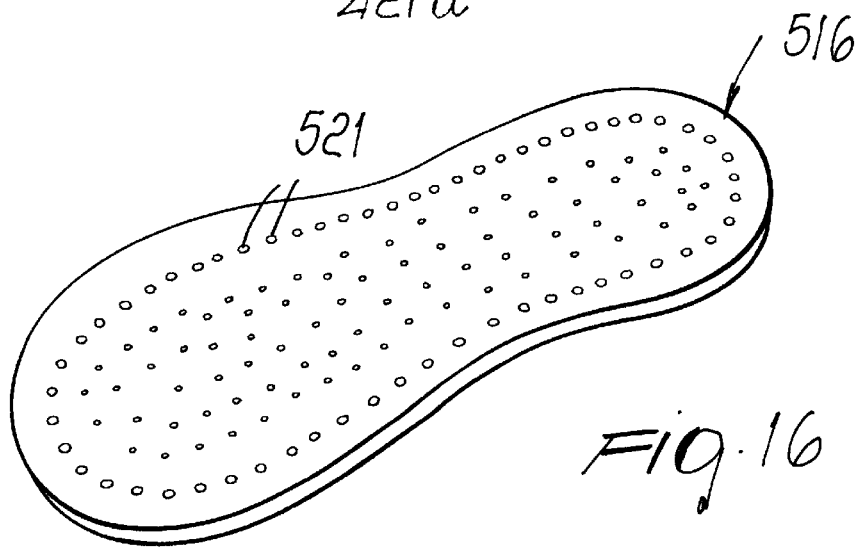
FIG. 16 is a view of an assembly insole used among the components of the shoe of FIG. 15.
Figure 12:
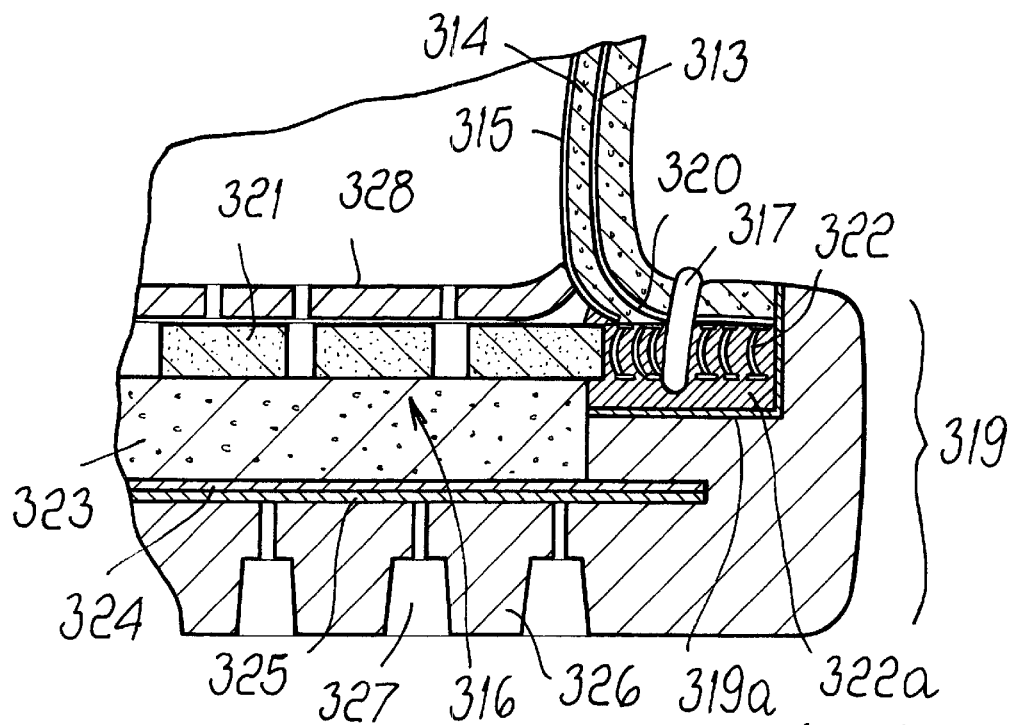
FIG. 12 is an enlarged-scale sectional view of a detail of the shoe of FIG. 10 in assembled condition.
Figure 15:
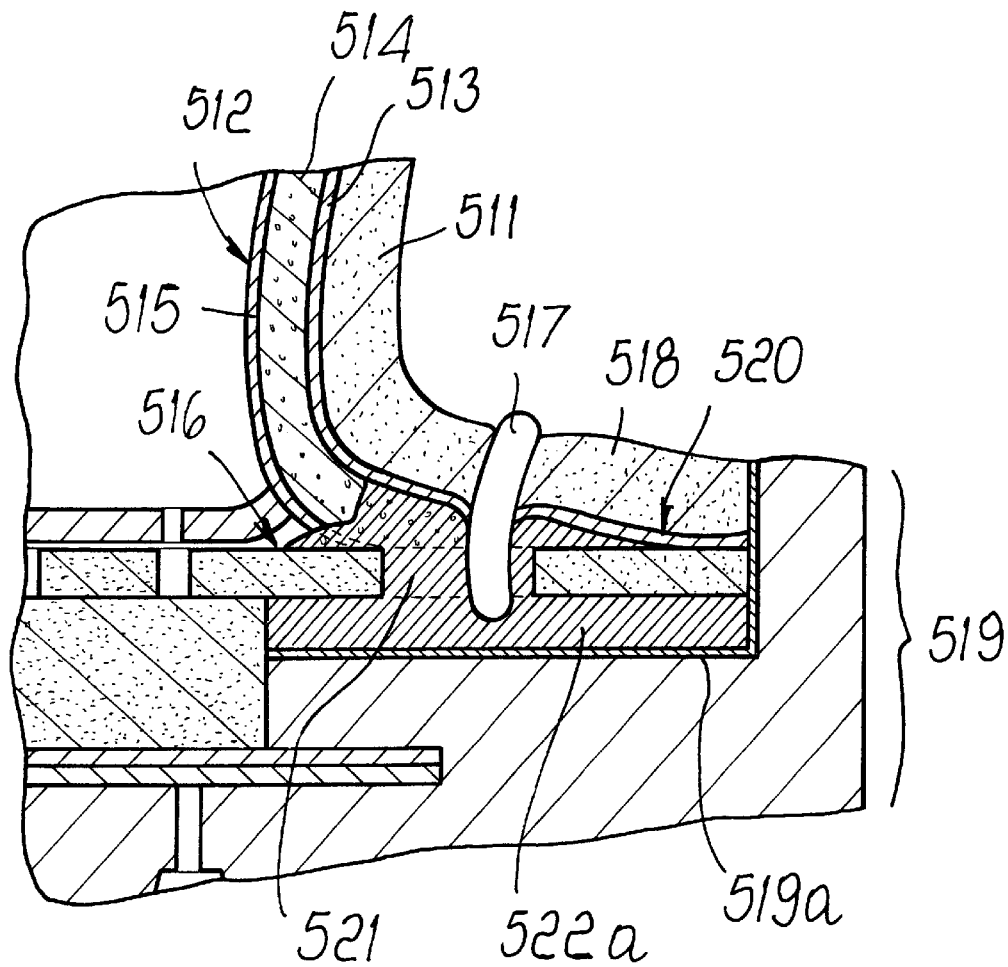
FIG. 15 is an enlarged-scale sectional view of a detail of a sixth embodiment of the shoe.

With reference now to FIGS. 15 and 16, in a sixth possible embodiment the insole, now designated by the reference numeral 516, is made of a single piece of moisture-permeable material such as leather, felt, cellulose material, et cetera and/or perforated material so as to allow moisture to pass through the single piece insole, which further has at least one row of holes 521 along its entire perimeter at a preset distance from the outside edge, so that the insole 516 is, through the holes 521, joined by means of stitched seams 517 to the folded edge 518 of the upper 511 which is coupled to the edge 520 of the lining 512 with the membrane 513.

As regards the rest, the manufacturing process is the same as in the preceding embodiments, with the sealing 522a of the regions with a stitched seam 517 and the joining, by means of glue 519a, of the polyurethane sole 519 so as to seal the stitched seams 517 and the adjacent regions.

In particular, the sealants 522a may penetrate through the holes 521 about the stitched seams 517 and bond with the outwardly folded edge 520 of the lining 512, and/or with the outwardly folded edge 518 of the upper 511. For this purpose therefore, at least one or more of the components 513, 514, 515 of lining 512 (including in particular the membrane 513, and middle filler layer 514 as seen in FIG. 15), and/or the outwardly folded edge 518 of the upper 511, and/or the stitched seams 517 themselves, may be made of materials which are permeable to such sealants so as to provide an overall sealed configuration which prevents passage of moisture through the thus sealed regions. The composite upper/insole assembly may be initially formed separately from the composite outsole assembly, and then these two separate composite assemblies may be mutually joined to form the shoe, for example by means of the adhesives 519a. The adhesive 519a may be chosen such that a moisture-proof seal is provided at its surfaces in contact with both the sealants 522a and the relevant portions of the upper assembly, and the corresponding portion of the sole 519.

Figure 17:
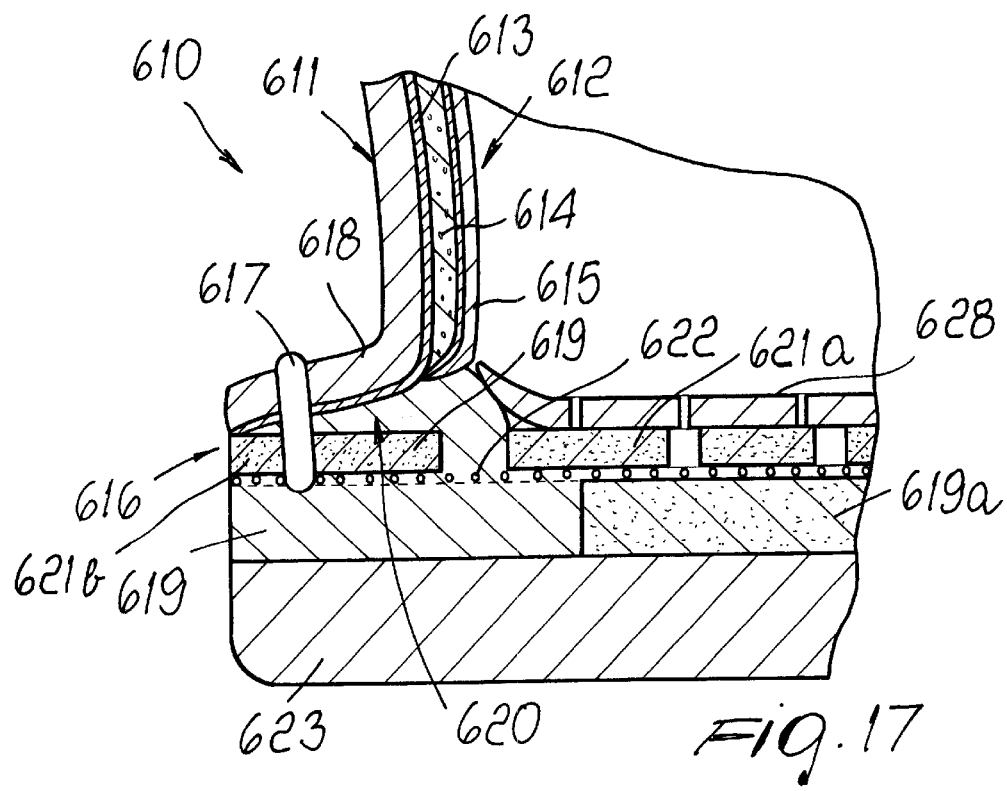
FIG. 17 is an enlarged-scale sectional view of a detail of a seventh embodiment of the shoe.
Figure 18:
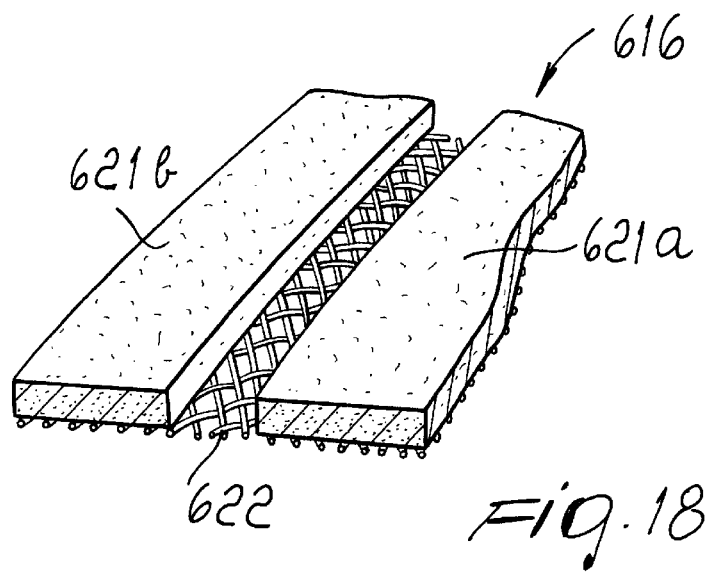
FIG. 18 is a view of a detail of an assembly insole used among the components of thee shoe of FIG. 17.

With reference to FIGS. 17 and 18, a waterproof and moisture-permeable shoe according to another preferred aspect of the invention is designated by the reference numeral 610 in a seventh embodiment.

The shoe 610 comprises a composite moisture permeable and waterproof upper structure formed of a moisture-permeable upper 611, made for example of natural leather without hiding pigments, which is associated with a lining 612 which is constituted in succession by a moisture-permeable and waterproof membrane 613 arranged adjacent to the upper 611, by a layer 614 made of moisture-permeable open-cell foamed polymer, and by an inner moisture-permeable fabric 615.

In other cases, the lining can of course be provided without at least one of the layers 614 and 615 and/or can have layers of different materials, which in any case is such as to allow to provide an overall moisture-permeable and waterproof inner lining.

The various parts of the lining 612 may be mutually joined by stitching at selected stitched regions which are conveniently sealed, for example by means of adhesives and/or sealants or by means of appropriate thermal bonding processes, so as to avoid compromising the waterproofness and moisture-permeability of the lining 612.

The lining 612 is associated with the upper 611 by spot gluing, i.e. only at selected regions, so as to avoid compromising moisture permeation through the membrane 613, and thereby to produce an upper assembly which is formed by the mutually joined upper 611 and lining 612, and which is also itself moisture-permeable and waterproof.

The shoe 610 further comprises an insole 616 to which an outwardly-folded lower edge 618 of the upper 611 is joined perimetrically by means of stitched seams 617.

The shoe 610 further comprises a mid-sole 619 which is made of a waterproof material and is, in one preferred embodiment, injection-molded below the insole 616.

A filler 619a is provided if the mid-sole 619 is internally, i.e. centrally, perforated.

The lower edge 620 of the lining 612, with the membrane 613 exposed, in one preferred embodiment due to paring with removal of the fabric 615, is folded outwardly together with the edge 618 of the upper 611. Alternatively, the membrane 613 may be exposed due to the fact that the fabric 615 has smaller dimensions, before and after assembly of the composite upper structure, than such membrane 613.

The insole 616 is further constituted by three components: an inner one 621a and an outer perimetric one 621b, which can be made of moisture-permeable materials such as fabric, leather, felt, cellulose material et cetera or perforated materials; and an outer component 622, which is constituted by a mesh on which the preceding components are glued, leaving free a perimetric band interposed between the two components 621a and 621b which is accordingly permeable to plastics, particularly polyurethane, in the fluid state.

The components 621a, 621b and 622 of the insole 616 can also be joined to each other by means of stitched seams.

Also according to the invention, the mid-sole 619 in this case is made of injection-molded polyurethane, or other adapted sealant material, so as to provide a seal of the regions of the stitched seams 617 and of the edge of the lining 612 with the membrane 613 by penetration of the polyurethane in the fluid state, completely separating and waterproofing the inside of the shoe from the outside in these critical regions.

The sealant material, particularly in the form of fluid plastic material or polyurethane of the injection molded mid-sole 619 penetrates through the outer component 622 at the band between the inner and outer components 621a and 621b of the insole 616 and impregnates the outwardly folded edge of the upper assembly, in particular at the region about the stitches 617 and in particular with the exposed membrane 613, to provide a waterproof seal at these critical regions.

In the case being considered, the mid-sole 619 is further joined, in a downward region, to an outsole 623 by gluing or overmolding.

The shoe is completed by an inner sole 628 which is perforated and/or moisture-permeable and is made for example of leather.

It is envisaged that the insole 616 may be connected to the upper composite assembly and/or the lower composite sole structure formed by the outsole 623 and mid-sole 619 in any one of the manners as described above for the other embodiments of the invention. Moreover, it is envisaged that the layers formed by the inner sole 628, insole 616, midsole 619, and outsole 623 together form an overall waterproof and moisture-permeable structure for the shoe, particularly when a waterproof and moisture-permeable membrane is incorporated into the midsole 619 and/or outsole 623 in a manner as described above for the previous embodiments. Alternatively, the outsole 623 may be made of solid waterproof material such that the moisture permeability of the shoe is reserved only for the composite upper assembly. Similarly, for the previously described embodiments, it is envisaged that the overall sole structure may be provided as exclusively waterproof while the moisture permeability of the shoe is reserved only for the composite upper assembly, while a waterproof seal is provided in the regions at the outwardly folded edge of the upper assembly particularly at the stitches which connect such outwardly folded edge to the composite sole structure.

Figure 19:
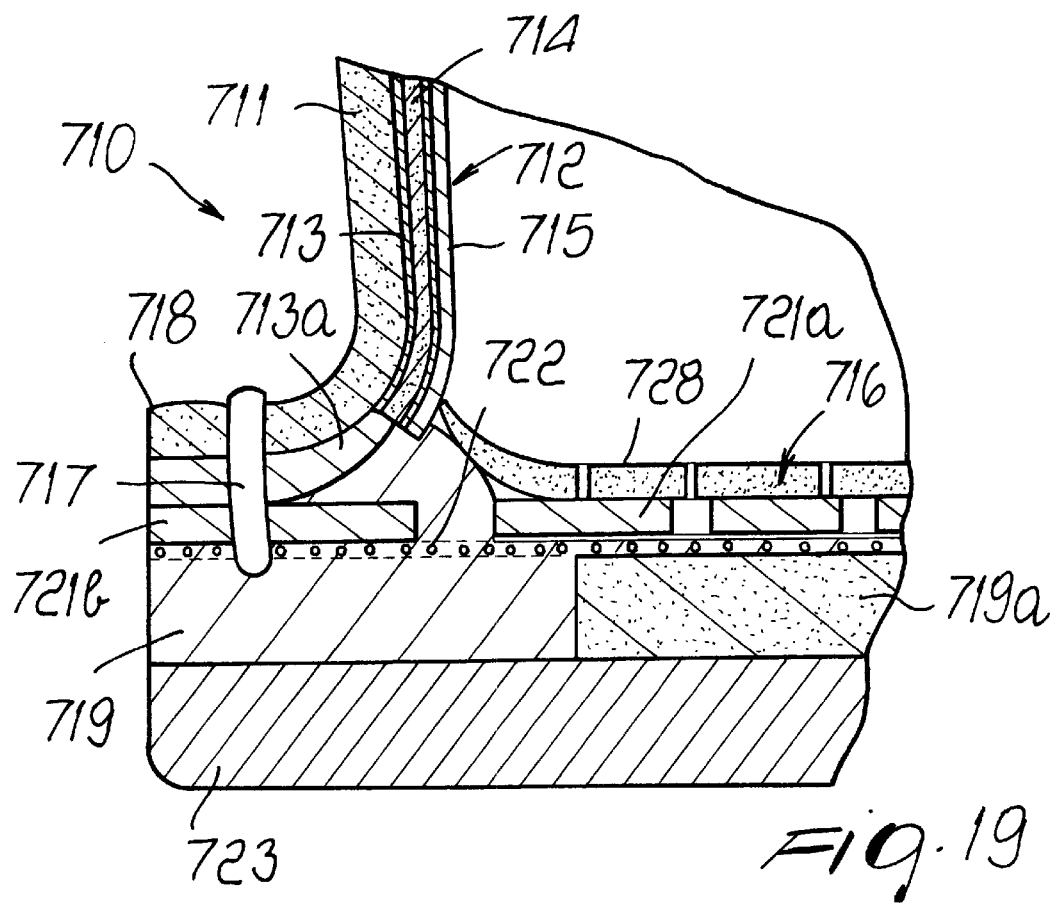
FIG. 19 is an enlarged-scale sectional view of a detail of an eighth embodiment of the shoe.
Figure 20:
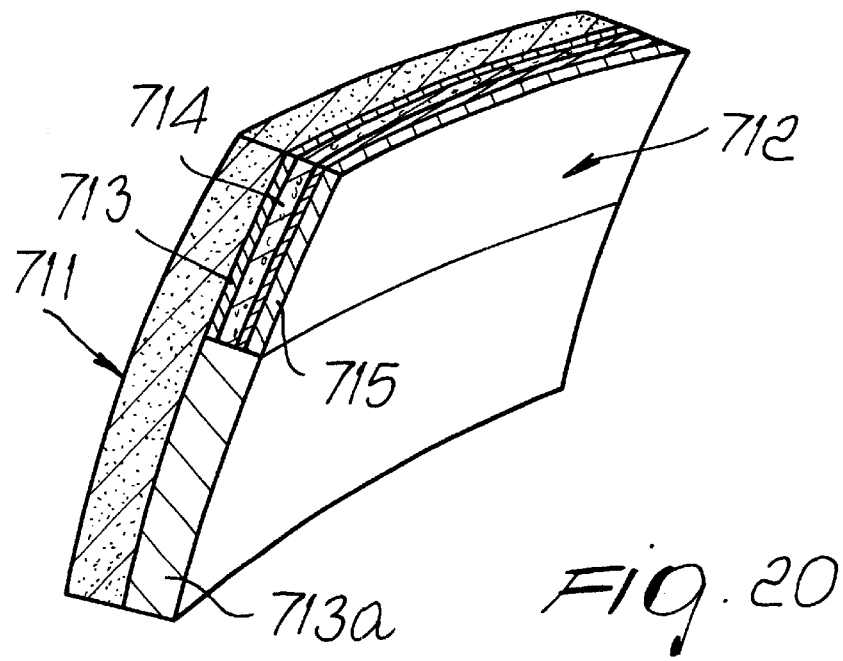
FIG. 20 is a sectional view of a detail of an upper used among the components of the shoe of FIG. 19.

With reference to FIGS. 19 and 20, a waterproof and moisture-permeable shoe according to the invention, in an eighth embodiment, is designated by the reference numeral 710.

The shoe 710 comprises a composite moisture permeable and waterproof upper structure formed of a moisture-permeable upper 711, for example made of natural leather without hiding pigments, which is associated with a lining 712 which is constituted in succession by a moisture-permeable and waterproof membrane 713 arranged adjacent to the upper 711, by a layer 714 of moisture-permeable open-cell foamed polymer, and by an inner moisture-permeable fabric 715.

In other cases, the lining can of course be provided without at least one of the layers 714 and 715 and/or can have layers of different materials, which in any case is such as to allow to provide an overall moisture-permeable and waterproof inner lining.

The various parts of the lining 712 may be mutually joined by stitching at selected stitched regions which are conveniently sealed, for example by means of adhesives and/or sealants or by means of appropriate thermal bonding processes, so as to avoid compromising the waterproofness and moisture-permeability of the lining 712.

The lining 712 is associated with the upper 711 by spot gluing, i.e. only at selected regions, so as to avoid compromising moisture permeation through the membrane 713, and thereby to produce an upper assembly which is formed by the mutually joined upper 711 and lining 712, and which is also itself moisture-permeable and waterproof.

The membrane 713 differs from the previously described membrane 613 in that instead of having an exposed portion it is replaced, at the edge, by an end portion 713a made of polymeric material, for example polyurethane, which is sealed so as to give continuity to the waterproofing.

The shoe 710 further comprises an insole 716 to which a lower edge 718 of the upper 711, which is folded outwardly, is joined perimetrically by means of stitched seams 717.

The shoe 710 further comprises a mid-sole 719 made of waterproof material which is, in one preferred embodiment, injection-molded below the insole 716.

If the mid-sole 719 is internally perforated, i.e. centrally, a filler 719a is provided as in the previous embodiment.

The lower edge 720 of the lining 712, with the exposed end portion 713a, is folded outward together with the edge 718 of the upper 711.

The insole 716 is further made of three components just as in the previous embodiment: an inner one 721a and a perimetric one 721b, which can be made of moisture-permeable materials such as fabric, leather, felt, cellulose material, et cetera or perforated; and an outer component 722 which is constituted by a mesh on which the preceding components are glued, leaving free a perimetric band interposed between the two components 721a and 721b which is thus permeable to plastic materials, particularly polyurethane, in the fluid state.

The components 721a, 721b and 722 of the insole 716 can also be mutually joined by means of stitched seams.

Also according to the invention, the mid-sole 719 is in this case made of injection-molded polyurethane, or other adapted sealant material, so as to seal the regions of the stitched seams 717 and of the edge of the lining 712 with the end portion 713a by penetration of the polyurethane in the fluid state, fully separating and waterproofing the inside of the shoe from the outside in these critical regions.

The sealant material, particularly in the form of fluid plastic material or polyurethane of the injection molded mid-sole 719 penetrates through the outer component 722 at the band between the inner and outer components 721a and 721b of the insole 716 and bonds with the exposed end portion 713a, to provide a waterproof seal.

In the case being considered, the mid-sole 719 is further joined in a downward region, by gluing or overmolding, to an outsole 723.

The shoe is completed by an inner sole 728 which is perforated and/or moisture-permeable and is made, for example, of leather.

It is envisaged that the composite upper including the components as seen in FIG. 20 may be substituted for the respective composite upper in any one or more of the above-described embodiments.

In practice it has been observed that the intended aim and objects of the present invention have been achieved.

A shoe of the IDEAL type has in fact been obtained whose structure allows, in production, much easier and faster manufacturing than current shoes, leading to a consequent reduction in times and costs.

The shoe is completely waterproof and is moisture-permeable in the regions of the upper and, in this case, also of the tread, but in other cases the tread may be provided by a single block of polyurethane or other adapted plastic material if simple waterproofing (i.e. without moisture permeability) is preferred for the tread.

The invention thus conceived is susceptible of numerous modifications and variations, all of which are within the scope of the inventive concept.

Thus, for example, the insole can be provided with an outer ring made of any material that is adapted to be crossed by the polyurethane flow.

The outer ring can be fixed to the rest of the insole by way of various systems, such as stitching, gluing, high-frequency thermal bonding, direct injection on the insole if it is constituted by a band of mesh.

As an alternative, the ring can be inserted between the inner part of the insole and an outer edge, both made of rigid material and having the same or different characteristics.

In another alternative, it is possible to apply by gluing, stitching, high-frequency thermal bonding an additional and more rigid outer ring in order to facilitate the stitching operations and give the shoe a neater appearance.

In practice, the materials used, so long as they are compatible with the contingent use, as well as the dimensions, may be any according to requirements.

The disclosures in Italian Patent Applications No. PD99A000207 and No. PD99A000263 from which this application claims priority are incorporated herein by reference.

What is claimed is:

1. A waterproof and moisture-permeable shoe comprising:
   a moisture-permeable and waterproof upper assembly having a lower outwardly-folded edge which extends outwardly away from the inside of the shoe;
   an insole having an outer peripheral component to which said lower outwardly-folded edge of said upper assembly is perimetrically connected;
   a plurality of stitches which connect said lower outwardly-folded edge of said upper assembly perimetrically to said outer peripheral component of said insole;
   a waterproof outsole connected below said insole; and
   a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region.

2. The waterproof and moisture-permeable shoe according to claim 1, wherein said moisture-impermeable sealing material of said waterproof sealing connecting element is a hardened material which has been injected in a fluid state.

3. The waterproof and moisture-permeable shoe according to claim 2, wherein said hardened material which has been injected in a fluid state of said waterproof sealing connecting element is chosen among the group consisting of thermoplastic materials, polyurethane, silicones, and polymers.

4. The waterproof and moisture-permeable shoe according to claim 2, wherein said waterproof sealing connecting element is formed of a portion of said outsole.

5. The waterproof and moisture-permeable shoe according to claim 2, wherein said waterproof sealing connecting element is formed of a portion of a midsole arranged between said insole and said outsole.

6. The waterproof and moisture-permeable shoe according to claim 1, wherein said at least one sealed region includes a sealed region extending about said plurality of stitches.

7. The waterproof and moisture-permeable shoe according to claim 6, wherein said moisture-impermeable sealing material of said waterproof sealing connecting element is a hardened material which has been injected in a fluid state and which extends about said plurality of stitches.

8. The waterproof and moisture-permeable shoe according to claim 1, wherein said upper assembly comprises a moisture-permeable and waterproof membrane.

9. The waterproof and moisture-permeable shoe according to claim 1, wherein said lower outwardly-folded edge of said upper assembly includes a polymeric material end portion, said waterproof sealing connecting element being connected with said polymeric material end portion.

10. The waterproof and moisture-permeable shoe according to claim 1, wherein said outer peripheral component of said insole comprises a perimetric ring made of fabric which is permeable to plastic materials in a fluid state.

11. The waterproof and moisture-permeable shoe according to claim 1, wherein said outer peripheral component of said insole comprises a series of perimetric holes extending entirely through said insole at a distance from an outer perimetric edge of said insole.

12. The waterproof and moisture-permeable shoe according to claim 1, wherein at least an inner component of said insole forms a structural support for a user's foot.

13. The waterproof and moisture-permeable shoe according to claim 1, wherein said waterproof outsole is also moisture-permeable.

14. An upper/insole assembly for use in a waterproof and moisture-permeable shoe, the upper/insole assembly comprising:
   a moisture-permeable and waterproof upper assembly having a lower outwardly-folded edge which extends outwardly away from the inside of the upper/insole assembly;
   an insole having an outer peripheral component to which said lower outwardly-folded edge of said upper assembly is perimetrically connected;
   a plurality of stitches which connect said lower outwardly-folded edge of said upper assembly perimetrically to said outer peripheral component of said insole; and
   a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region.

15. The upper/insole assembly according to claim 14, wherein said moisture-impermeable sealing material of said waterproof sealing connecting element is a hardened material which has been injected in a fluid state.

16. The waterproof and moisture-permeable shoe according to claim 15, wherein said hardened material which has been injected in a fluid state of said waterproof sealing connecting element is chosen among the group consisting of thermoplastic materials, polyurethane, silicones, and polymers.

17. A method for manufacturing a waterproof and moisture-permeable shoe, comprising the steps of:
   providing a moisture-permeable and waterproof upper assembly having a lower outwardly-folded edge which extends outwardly away from the inside of the shoe;
   providing an insole having an outer peripheral component;
   connecting said lower outwardly-folded edge of said upper assembly perimetrically to said outer peripheral component of said insole by stitching with a plurality of stitches;
   providing a waterproof outsole and connecting said waterproof outsole below said insole; and
   connecting said lower outwardly-folded edge of said upper assembly to said outer peripheral component of said insole in at least one sealed region such as to provide a waterproof seal in said at least one sealed region by means of a waterproof sealing connecting element which is made of moisture-impermeable sealing material.

18. The method according to claim 17, further comprising impregnating and extending said moisture-impermeable sealing material of said waterproof sealing connecting element through said outer peripheral component of said insole and so as to moisture-sealingly connect said moisture-impermeable sealing material of said waterproof sealing connecting element with at least one portion of said lower outwardly-folded edge of said upper assembly.

19. The method according to claim 17, comprising injecting said moisture-impermeable sealing material of said waterproof sealing connecting element in a fluid state, and consequently allowing said moisture-impermeable sealing material to harden.

20. The method according to claim 19, comprising choosing said hardened material which has been injected in a fluid state of said waterproof sealing connecting element among the group consisting of thermoplastic materials, polyurethane, silicones, and polymers.

21. The method according to claim 19, comprising injection molding said outsole and forming said waterproof sealing connecting element from a portion of said outsole.

22. A waterproof and moisture-permeable shoe comprising:
   a moisture-permeable and waterproof upper assembly having a lower outwardly-folded edge which extends outwardly away from the inside of the shoe;
   an insole having an outer peripheral component to which said lower outwardly-folded edge of said upper assembly is perimetrically connected;
   a plurality of stitches which connect said lower outwardly-folded edge of said upper assembly perimetrically to said outer peripheral component of said insole;
   a waterproof outsole connected below said insole; and
   a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region;
   said moisture-impermeable sealing material of said waterproof sealing connecting element extending through and being impregnated in said outer peripheral component of said insole and being further moisture-sealingly connected with at least one portion of said lower outwardly-folded edge of said upper assembly.

23. A waterproof and moisture-permeable shoe comprising:
   a moisture-permeable and waterproof upper assembly having a lower outwardly-folded edge which extends outwardly away from the inside of the shoe;
   an insole having an outer peripheral component to which said lower outwardly-folded edge of said upper assembly is perimetrically connected;
   a plurality of stitches which connect said lower outwardly-folded edge of said upper assembly perimetrically to said outer peripheral component of said insole;
   a waterproof outsole connected below said insole; and a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region;

said upper assembly comprising a moisture-permeable and waterproof membrane;

said moisture-permeable and waterproof membrane extending in said lower outwardly-folded edge of said upper assembly, and said moisture-impermeable sealing material of said waterproof sealing connecting element extending through and being impregnated in said outer peripheral component of said insole and being further moisture-sealingly connected with said moisture-permeable and waterproof membrane extending in said lower outwardly-folded edge of said upper assembly.

24. A waterproof and moisture-permeable shoe comprising:

a moisture-permeable and waterproof upper assembly having a lower outwardly-folded edge which extends outwardly away from the inside of the shoe;

an insole having an outer peripheral component to which said lower outwardly-folded edge of said upper assembly is perimetrically connected;

a plurality of stitches which connect said lower outwardly-folded edge of said upper assembly perimetrically to said outer peripheral component of said insole;

a waterproof outsole connected below said insole; and a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region;

said outer peripheral component of said insole comprising a perimetric fine mesh which is permeable to plastic materials in a fluid state.

25. A waterproof and moisture-permeable shoe comprising:

a moisture-permeable and waterproof upper assembly having a lower outwardly-folded edge which extends outwardly away from the inside of the shoe;

an insole having an outer peripheral component to which said lower outwardly-folded edge of said upper assembly is perimetrically connected;

a plurality of stitches which connect said lower outwardly-folded edge of said upper assembly perimetrically to said outer peripheral component of said insole;

a waterproof outsole connected below said insole; and a waterproof sealing connecting element which is made of moisture-impermeable sealing material and which connects said lower outwardly-folded edge of said upper assembly to said outer peripheral component of said insole in at least one sealed region such as to provide a waterproof seal in said at last one sealed region;

said outer peripheral component of said insole comprising a gap of a mesh arranged between an inner component and an outer component of said insole both of which are attached to said mesh.

26. An upper/insole assembly for use in a waterproof and moisture-permeable shoe, the upper/insole assembly comprising:

a moisture-permeable and waterproof upper assembly having a lower outwardly-folded edge which extends outwardly away from the inside of the upper/insole assembly;

an insole having an outer peripheral component to which said lower outwardly-folded edge of said upper assembly is perimetrically connected;

a plurality of stitches which connect said lower outwardly-folded edge of said upper assembly perimetrically to said outer peripheral component of said insole; and a waterproof sealing connecting element which is made of moisture-impermeable sealing material and which connects said lower outwardly-folded edge of said upper assembly to said outer peripheral component of said insole in at least one sealed region such as to provide a waterproof seal in said at least one sealed region;

said moisture-impermeable sealing material of said waterproof sealing connecting element extending through and being impregnated in said outer peripheral component of said insole and being further moisture-sealingly connected with at least one portion of said lower outwardly-folded edge of said upper assembly.

* * * * *